Nov. 29, 1932.  A. S. ANZELL  1,889,085
COMBINATION MIRROR AND ILLUMINATING DEVICE
Filed July 10, 1931
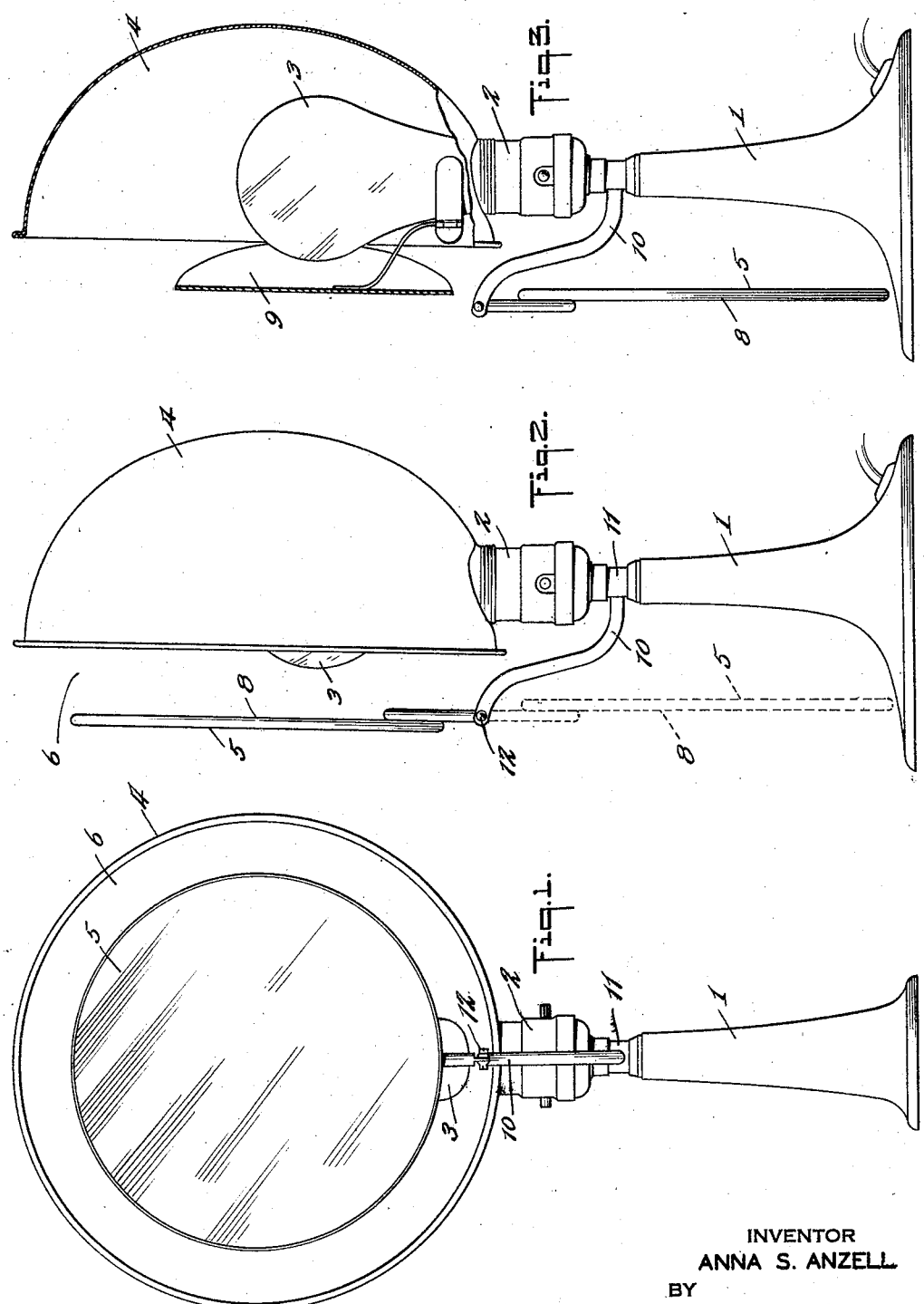
INVENTOR
ANNA S. ANZELL
BY
Darby & Darby
ATTORNEYS Patented Nov. 29, 1932

1,889,085

UNITED STATES PATENT OFFICE

ANNA SYLVIA ANZELL, OF NEW YORK, N. Y.

COMBINATION MIRROR AND ILLUMINATING DEVICE

Application filed July 10, 1931. Serial No. 549,903.

More specifically my invention relates to that class of device in which is combined a mirror for make-up or shaving, and means for illuminating the face by soft reflected light so directed that no shadows are cast upon it and no glare thrown into the eyes, thus assuring an accurate determination of facial coloring and condition.

My invention also contemplates a device of this nature in which the light source is concealed by the mirror which also serves as a secondary reflector and to cast the intercepted rays back upon the main reflector to augment the illuminating power of the lamp and in which the mirror is so positioned that the face will be uniformly illuminated from all directions.

The device of my invention is also intended for use as a reading lamp. Consequently the mirror is so mounted that it may be swung completely out of line with the light rays from the lamp and, if desired, a decorative shield substituted therefor to preserve the advantages of indirect lighting.

My invention has the merits of simplicity, attractive appearance, wide utility, and manufacturing practicability. One form of my invention is shown, for illustrative purposes only, in the following drawing, in which—

Figure 1 is a front elevation;

Figure 2 is a side elevation; and

Figure 3 is a side elevation, partly in section, of the device arranged as a reading lamp, the mirror being swung out of position and the decorative shield substituted therefor.

As will be seen from the drawing, the device consists of a base or standard 1, preferably hollow, so that the lamp cord may be concealed therein. At the top of the base I mount a standard incandescent light socket 2 in which a standard incandescent lamp 3 of any desired candle-power may be positioned. A dish-shaped reflector 4, the exact form of which may be varied within wide limits, may also be mounted upon the socket, as shown in the drawing, or in any other convenient way. A mirror 5, preferably having the same general outline as the edge of the reflector, but of smaller dimensions, is so mounted upon the base that it may be positioned directly in front of the front edge of the reflector, parallel thereto and also symmetrically with respect to the reflector opening, so that, while the lamp is concealed by the mirror, an annular space 6 remains between the reflector edge and the mirror through which the light is reflected to fall uniformly upon the face from all directions.

A reflecting surface upon the back 8 of mirror 5 serves to reflect the intercepted rays back upon the main reflector 4, thus utilizing effectively the illuminating power of the lamp. The mirror 5 is so mounted that it may be swung completely out of the line of the light rays from the lamp, as shown in Fig. 3, when the device is to be used as a reading lamp. If desired a small decorative shield 9 of any desired form may be substituted to protect the eyes from the direct light rays and preserve the advantages of indirect lighting.

A suitable mounting for the mirror is illustrated. It consists of a suitably curved arm 10, one end of which is securely affixed to the base 1 or socket 2, as for example by a collar 11, the other end serving as the pivot 12 for the swinging mirror. Other forms of mounting for the mirror may, of course, be employed. For example, it may be secured to the reflector 4 by any suitable hinged bracket positioned at the top or bottom or either side to permit the mirror to be swung out of the way in any of these directions. Although it is not essential, I prefer that the reflecting surface of the reflector 4 should be white and have a mat finish so that the reflected light will appear soft and free from glare.

In order to enhance the appearance of my device the back of the mirror 5, if nickeled, or chromium or silver plated, may be engraved with an attractive design, although it may, of course, be enameled in white or any other light color and decorated with a colored design without materially impairing the efficiency of the device. It will be noted that the lamp is supported solely by the socket. In devices of this sort it is not essential that the source of illumination should be positioned with absolute symmetry within the reflector. Therefore, any standard size of lamp may be used without altering the construction and the desired intensity of illumination secured.

I claim:

A combination mirror and illuminating device comprising a base, a lamp socket mounted thereon, a reflector mounted on said socket, a forwardly and upwardly projecting arm on said base, a mirror hingedly mounted on said arm and so positioned as to partially close the opening of said reflector and conceal a lamp in said socket, but to permit the passage of reflected rays of light between its edge and the edge of the reflector, said mirror also being adapted, through its hinged mounting, to be swung forward and downward entirely out of the path of direct light rays from said lamp to a position below the reflector and without affecting the position of the lamp socket with respect to the reflector.

In testimony whereof I have hereunto set my hand on this 9th day of July, A. D., 1931.

ANNA SYLVIA ANZELL.